UNITED STATES PATENT OFFICE.

MILTON FLETCHER LINDSLEY, OF WEST HOBOKEN, NEW JERSEY.

EXPLOSIVE COMPOUND.

SPECIFICATION forming part of Letters Patent No. 333,872, dated January 5, 1886.

Application filed May 19, 1885. Serial No. 166,053. (No specimens.)

*To all whom it may concern:*

Be it known that I, MILTON FLETCHER LINDSLEY, of West Hoboken, in the county of Hudson and State of New Jersey, have invented a new and Improved Explosive Compound, of which the following is a full, clear, and exact description.

My compound consists of the following ingredients, combined in the proportions stated, viz: nitro-cellulose, fifty pounds; saltpeter, thirty-eight pounds; charcoal, five pounds; chlorate of potash, three pounds; starch, two pounds; carbonate of potash, two pounds.

In making the compound I pulverize each ingredient (with the exception of the starch) separately by any suitable means, and then mix them all together (with the exception of the starch) in a wooden mixing-trough by the aid of a wooden spatula. The starch I dissolve in water in the proportion of seven pounds of water to each one hundred pounds of the batch. After the starch is thoroughly dissolved it is boiled, and then thoroughly mixed with the other ingredients in the mixing-trough. The mixture is then placed, together with a number of bronze balls, in a revolving drum made of wood and lined with leather. The drum is turned on its horizontal axis at a moderate speed, and the whole mass is soon thoroughly incorporated. The compound is then removed from the drum, and is subjected to a heavy pressure with a hydraulic press, or preferably with a screw, so as to leave the compound in cakes from a half to three quarters of an inch in thickness. The cakes thus formed are broken into granules by being passed through three pairs of brass rolls provided with diamond-shaped projections, the projections of the upper rolls being made coarser than those of the lower rolls. The granulated compound is then showered upon a set of sieves having a vibratory movement, and by which the granules are graded and dusted. The graded granules are then polished by their own friction in drums similar to the one hereinbefore described, and which are revolved with a slow movement. The polished granules are then spread on canvas-covered frames, which are placed in racks in a drying-room, where they are exposed to a temperature of about eighty degrees Fahrenheit, (80° F.) for a few hours, after which the temperature is raised to one hundred and twenty degrees Fahrenheit, (120° F.,) and kept at that point for about twelve hours, when the compound is ready to be finished, which consists in removing the dust from the granules by means of a revolving bolt or a drum covered with bolting-cloth.

The compound thus made forms a powder suitable for use in fire-arms of all descriptions, and which will give a high initial velocity and consequently a low trajectory, and at the same time will give a low pressure on the wall and breech of the arm, will not cake or foul in the bore of the arm, and will produce less smoke and less noise, and cause less recoil of the arm than ordinary powder.

Having thus described my invention, I claim as new and desire to secure by Letters Patent—

The herein-described explosive compound, consisting of nitro-cellulose, saltpeter, charcoal, chlorate of potash, starch, and carbonate of potash, mechanically mixed in the proportions specified.

MILTON FLETCHER LINDSLEY.

Witnesses:
 JAMES T. GRAHAM,
 C. SEDGWICK.